United States Patent Office 2,834,649
Patented May 13, 1958

2,834,649

MANUFACTURE OF CHLORINE DIOXIDE

Souren Z. Avedikian, Larchmont, N. Y.

No Drawing. Application January 30, 1956
Serial No. 562,017

4 Claims. (Cl. 23—152)

This invention relates to a composition for preparing chlorine dioxide and to the method of preparing chlorine dioxide from said composition.

Liquid chlorine dioxide is of particular interest in the bleaching of wood pulp since it does not attack cellulosic fibers. However, chlorine dioxide gas is not a stable compound so that it must be generated at the place of use. The danger of explosion is avoided by mixing chlorine dioxide with air or other inert gas to obtain a mixture containing less than 10 percent chlorine dioxide by volume.

Also relatively concentrated aqueous solutions of chlorine dioxide are stable at room temperature for long periods of time.

There are many methods for preparing chlorine dioxide but they all are expensive procedures or cumbersome as to utilization of time and factory space.

It is an object of this invention to produce chlorine dioxide more inexpensively than ever before.

It is another object to produce chlorine dioxide conveniently and readily.

It is a further object to produce chlorine dioxide with a minimum of apparatus.

It is still another object to produce chlorine dioxide by a process having a by-product of ready sale.

These and other objects of this invention will become apparent upon reading the following descriptive disclosure.

According to this invention a stable mixture of salts is prepared which readily yields chlorine dioxide upon treatment with acid.

The stable mixture consists preferably of alkali metal chlorate and alkali metal sulfite, for example $NaClO_3$ and $Na_2SO_3$. Other operable mixtures of this invention are alkali metal chlorate and alkali metal nitrite, for example $NaClO_3$ and $NaNO_2$ and also alkali metal chlorate and alkali metal bi-sulfite, for example $NaClO_3$ and $NaHSO_3$.

The chlorate-sulfite mixture is preferably an intimate finely ground dry mixture of the two salts, each salt being finely ground preferably before the mixing step. Separate strong aqueous solutions of these two salts, viz. sodium chlorate and sodium sulfite are operable to release chlorine dioxide upon mixing followed by acid treatment. Furthermore the sulfite and chlorate may be in the form of a single stable aqueous mixture prior to acidification. Thus the operable saline mixtures of this invention may be dry or wet with water. These mixtures are stable for long periods of time, for example, several days or weeks so that they may be prepared long before need for their use.

Upon use the dry powder mixture is treated with dilute aqueous acid preferably with a dilute mineral acid such as sulfuric acid. However, in the case of the aqueous concentrated salt solutions these are treated with concentrated mineral acids. In either case chlorine dioxide is formed in abundant quantity. The chlorine dioxide so formed is swept out of the reaction vessel by an inert gas preferably air to give a mixture of 10 percent or less of chlorine dioxide.

The gaseous chlorine dioxide prepared by this invention is generated smoothly and the gas is uncontaminated with other gases, for example sulfur dioxide, harmful to the subsequent use of chlorine dioxide as a bleaching gas.

The temperature used to liberate chlorine dioxide from its mixture may be from 40° C. to 80° C. but preferably 60° C. to 70° C. is used.

The following examples illustrate this invention.

*Example I*

Solid finely ground sodium chlorate is mixed with solid finely ground sodium sulfite in the ratio of 213 pounds chlorate to 126 pounds sulfite. Next the mixture is slowly poured into a dual apertured but otherwise closed vessel provided with a large excess of dilute sulfuric acid of pH 1, the salt being introduced into the vessel through one of said apertures. The chlorine dioxide evolved is removed through the other aperture either alone or preferably by means of a current of air provided by conventional means to yield a mixed gas containing about 10 percent chlorine dioxide.

The chemical reaction is expressed by the following equation.

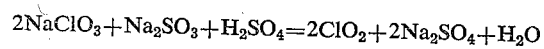
$$2NaClO_3 + Na_2SO_3 + H_2SO_4 = 2ClO_2 + 2Na_2SO_4 + H_2O$$

In other words two mols of sodium chlorate react with one mol of sodium sulfite to produce two mols of chlorine dioxide.

*Example II*

In this example 426 pounds of sodium chlorate are added to a vessel containing 200 gallons of water in which there are dissolved 208 pounds of sodium acid sulfite and the resulting solution is treated with concentrated aqueous sulfuric acid in a suitable amount to liberate $ClO_2$.

The chemical reaction for this mixture is expressed by the following equation:

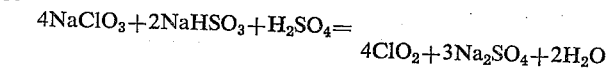
$$4NaClO_3 + 2NaHSO_3 + H_2SO_4 = 4ClO_2 + 3Na_2SO_4 + 2H_2O$$

In this example four mols of sodium chlorate react with two mols of sodium bi-sulfite to produce four mols of chlorine dioxide.

*Example III*

In this example 213 pounds of sodium chlorate are dissolved in 100 gallons of water and 69 pounds of sodium nitrite are dissolved in another 100 gallons of water. These two solutions are then mixed together and concentrated sulfuric acid is added in a suitable amount to liberate $ClO_2$.

The chemical reaction for this salt mixture is expressed by the following equation:

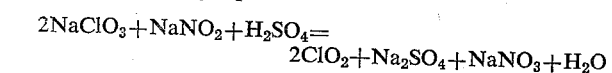
$$2NaClO_3 + NaNO_2 + H_2SO_4 = 2ClO_2 + Na_2SO_4 + NaNO_3 + H_2O$$

In all three examples herein above, the chlorine dioxide is evolved in substantially a chemically pure form.

In Examples I and II the sodium sulfate precipitates out of solution and thus is available for use in the sulfate or Kraft process of preparing wood pulp. Thus where the Kraft process is used, the bleaching of the wood fibers by the chlorine dioxide of this invention gives a salt useable as a make-up salt for the cooking liquor used to digest the wood chips.

Moreover, where the chlorine dioxide of this invention is used to bleach the sulfite fibers prepared by the sulfite wood pulping process, the acid waste sulfite liquors having a pH of about 2 may be used to liberate the chlorine dioxide from the dry salt mixture, in lieu of the sulfuric acid of Example I above.

This invention has been illustrated by means of three embodiments but clearly its scope is greater than these illustrations and such scope is intended to be covered in the claims herein.

Thus, molar equivalents of potassium chlorate or calcium chlorate may be used in place of sodium chlorate in the above three examples.

I claim:

1. A dry chemical composition of matter for liberating pure chlorine dioxide upon treatment with aqueous acid solution consisting of two moles of finely divided sodium chlorate mixed with one mole of finely divided sodium sulfite.

2. A wet composition of matter for liberating chlorine dioxide upon acidification consisting of two moles of an aqueous concentrated solution of alkali metal chlorate admixed with one mole of a concentrated solution of an alkali metal salt selected from the group consisting of sulfites, bi-sulfites and nitrites.

3. The method of preparing chlorine dioxide consisting of adding a dry mixture of salt consisting of two moles of finely divided sodium chlorate mixed with one mole of finely divided sodium sulfite to a suitable amount of aqueous acid solution to liberate chlorine dioxide.

4. The method of claim 3 wherein the acid solution is sulfuric acid solution maintained at 40° C. to 80° C.

References Cited in the file of this patent

UNITED STATES PATENTS

| | | |
|---|---|---|
| 2,309,457 | Hutchinson et al. | Jan. 26, 1943 |
| 2,317,443 | Cunningham | Apr. 27, 1943 |
| 2,335,808 | Soule | Nov. 30, 1943 |
| 2,338,268 | Stossel et al. | Jan. 4, 1944 |
| 2,451,826 | Haller | Oct. 19, 1948 |
| 2,481,854 | MacMahon | Sept. 13, 1949 |
| 2,482,891 | Aston | Sept. 27, 1949 |
| 2,484,402 | Day et al. | Oct. 11, 1949 |